July 21, 1964 T. P. ANDERSON ETAL 3,141,275

FILM MOUNTING ASSEMBLY

Filed Aug. 11, 1961 2 Sheets-Sheet 1

INVENTORS
Thomas P. Anderson
BY Robert Beispel
Hill, Sherman, Meroni, Gross & Simpson
ATTORNEYS

FILM MOUNTING ASSEMBLY

Filed Aug. 11, 1961

INVENTORS
Thomas P. Anderson
BY Robert Beispel
Hill, Sherman, Meroni, Gross & Simpson
ATTORNEYS

United States Patent Office 3,141,275

Patented July 21, 1964

3,141,275

FILM MOUNTING ASSEMBLY

Thomas P. Anderson, Winnetka, and Robert Beispel, Chicago, Ill., assignors to Microseal Corporation, Chicago, Ill., a corporation of Illinois Filed Aug. 11, 1961, Ser. No. 130,875

9 Claims. (Cl. 53—123)

This invention is directed to a method and apparatus for effecting the insertion of microfilm strips into film pockets formed within microfilm record cards.

With the ever increasing use of microfilm records and statistical cards in conjunction with one another, it has become desirable to provide a means for mounting a microfilm directly on such a statistical card. We have devised a record card having an aperture formed therein which has transparent enveloping members or sheets disposed on opposite sides of the card and overlying the aperture. The sheets, if rectangular in configuration, have three edges thereof secured to the opposed surfaces of the card by means of a suitable adhesive or the like which is placed on the card along the edges of the aperture but the fourth edges thereof are not sealed to the card although they do overlie the card (that is, that edge of each sheet does not terminate at the edge of the aperture). A microfilm strip can be maintained in the pocket formed intermediate the enveloping members or between one surface of the card and an adjacent enveloping member.

If the film strip is translucent and the enveloping members are transparent, the film strip may be viewed while still mounted on the record card since light may be transmitted through the transparent enveloping members. Thus, projectors can be arranged to accept such record cards so that the image on the film strip contained within a card can be projected on a screen to enlarge the image without necessitating removal of the film strip from its mounted position on the record card.

Other record cards, as noted above, have only a single enveloping member but are arranged so that the film strip can be maintained in a pocket formed between a portion of the card surface lying around the aperture and the enveloping member. In any case, some "film pocket" is formed by the enveloping member.

While the insertion of two or three film strip pieces into the film pockets in a like number of cards can be effected by hand, it is manifest that in those situations in which large numbers of film pieces must be card mounted, the hand mounting procedure is not practicable. Furthermore, hand mounting film pieces within record card film pockets is time consuming and may cause fingerprints or stains to appear on the film which would blur the image formed thereon when that image is projected on a screen.

Our invention is directed to a method and apparatus for effecting the insertion of film pieces into the film pockets formed in a multiplicity of cards. Basically, our invention consists in the provision of a supporting stand having a film bed and a card bed formed thereon and to a means for feeding a microfilm strip along the film bed and onto the surface of a card mounted on the card bed and thence into the film pocket formed within the card.

More specifically, the film and card beds are each substantially flat and the card bed lies in a plane displaced slightly below the horizontal film bed. In fact, the card bed is recessed from the plane of the film bed a distance approximately equal to the thickness of a record card so that the upper card surface is substantially coplanar with the film bed. A guide member is associated with the card bed so as to guide a card onto the bed so that the film pocket formed within the card will be aligned with the film bed. A shoulder interconnects the film and card beds and the card is placed on the card bed with one edge thereof in engagement with this shoulder.

A roll of microfilm is rotatably mounted on one end of the support and means are provided for moving the film strip along the film bed and thence onto the upper surface of the card and thence into the film pocket within the card. In order to keep the microfilm strip flattened against the film bed as it travels along that bed a cover plate is provided which is connected to the support and which overlies the film bed and an adjacent portion of the card bed. That portion of the cover plate overlying the card bed also, of course, tends to keep the record card flattened against the card bed.

An aperture is formed within the support transversely through the film bed and a slitter knife is movable therethrough. The cutting edge of the slitter knife passes through the aperture from beneath the film bed and into engagement with the cover plate and serves as an effective means of cutting a film strip piece to a desired longitudinal dimension. The cover plate is spaced above the film bed a distance approximately equal to or very slightly greater than the thickness of the microfilm passing therethrough so that a very effective cutting action is had.

We have recognized however that repeated usage of the slitter knife to cut the film strip might cause a build-up of minute particles chafed off the portion of the undersurface of the cover plate which is repeatedly struck by the edge of the slitter blade. In order to prevent this build-up of particles from interfering with the passage of the film strip through the space between the film bed and the undersurface of the cutter plate, we have formed a groove within the cover plate within which the blade edge can seat and this groove has a maximum cross-sectional dimension greater than the maximum cross-sectional width of the blade so that any particle build-up will be formed and remain within the groove and will not interfere with the passage of the film through the film bed.

Also, we prefer to form the cover plate of a transparent material so that the operator can see the placement of the film strip when the cutting action takes place. A scribe line is formed within the cover plate at a point overlying the aperture within the film bed and the slitter blade therein so that the operator can move the film strip along the film bed by means provided until the point of the strip at which he wishes to make a cut just underlies the scribe line. When the film strip is in such a position, the cutting action can be effected by movement of the slitter blade, by means provided, and a film piece will thus be formed separate from the film strip. It will be understood that for convenience of description, we hereafter refer to the "film piece" as that portion of a film strip which is of suitable size for placement within a record card pocket.

One of the principal advantages of our invention lies in the fact that the film piece, once cut, is moved into the record card pocket by the leading edge of the film strip so that separate means need not be provided for effecting insertion of this film piece into the film pocket. The cover plate is spaced above the card bed a distance approximately equal to the combined thicknesses of the film strip and the record card. A roller mounted within the undersurface of the cover plate at a point overlying the card bed but adjacent to the shoulder is effective to keep the record card in juxtaposition to the card bed so that the upper surface of the card is substantially coplanar with the film bed. Inasmuch as the spacing between the undersurface of the cover plate and the film bed is approximately equal to the thickness of the film strip it will be understood that movement of the leading or cut edge of the film strip toward the record card will act to push the film piece through the film bed inasmuch as the spacing between the cover plate and the film bed is not sufficient to permit the film strip to creep over or beneath the film piece.

The roller within the cover plate will keep the card in juxtaposition to the card bed so that as the leading edge of the film piece moves past the shoulder it will slide along the upper surface of the record card and then between the card and the roller and thence into the film pocket within the record card.

In order to insure that the upper surface of the record card will be positioned coplanar with or below the plane of the film bed when the film strip or film piece is moved from the film bed past the shoulder, we have provided a slight concavity in the card bed directly below the roller which is mounted within the cover plate.

A still further feature of our invention resides in the provision of means for projecting and enlarging the image contained on a film piece on a screen or the like by means of a projector while the card is still positioned on the card bed. A glass plate forms the actual surface of the card bed and overlies an aperture within the support through which a light may be passed to project the image contained on the film piece onto a screen or the like. Thus, by using a suitable projector and some sort of mirror system as is well known in the art, an enlargement of each film piece could be viewed on a screen as each piece is inserted within a respective card.

A particularly important feature of our invention resides in the fact that the microfilm is stored on a roll at one end of the support and is fed onto the film bed and through the device of this invention so that the natural curl of the microfilm caused by storage thereof on the roll can be employed to best advantage to facilitate insertion of film strip pieces within the film pockets in record cards. The film strip is fed through the machine so that the film tends to curl, though slightly, toward the film bed rather than the cover plate. Consequently, when the film piece slides onto the upper surface of the record card, this natural curl tends to urge the leading edge thereof beneath the unsecured edge portion of the enveloping member secured to the record card.

It is therefore a principal object of this invention to provide a means and method for effecting the insertion of microfilm pieces in the film pockets of record cards.

An important feature of this invention relates to the method of cutting a film piece from an elongated film strip and pushing the film piece by movement of the film strip into the film pocket of a record card.

Yet another object of the invention is directed to a means for effecting the insertion of a film piece in a record card pocket in which the image contained on the film piece can be projected on a screen while that film piece is disposed in the record card mounted on the film feeding mechanism.

Another object of the invention resides in the provision of a means for facilitating cutting of a film strip to the desired dimensions.

These and other objects, features and advantages of this invention will become apparent from time to time as the following specification proceeds and with reference to the accompanying drawings, wherein.

Figures 1, 2, 5:
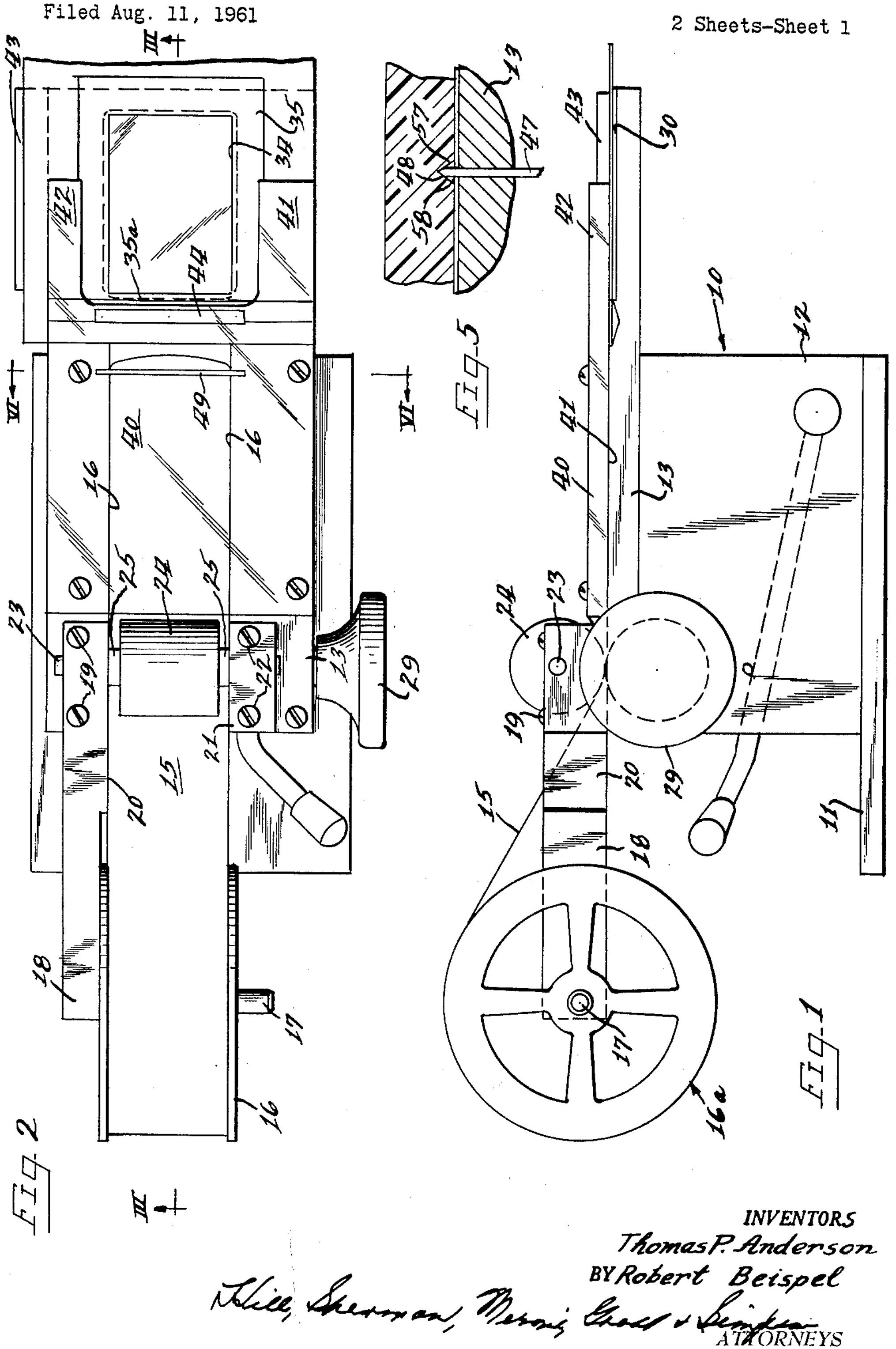
FIGURE 1 is a side elevational view of a film feeding mechanism constructed in accordance with the principles of our invention.
FIGURE 2 is a plan view of the film feeding mechanism illustrated in FIGURE 1.
FIGURE 5 is a fragmentary vertical sectional view through yet another portion of the structure illustrated in FIGURE 2.

The film feed mechanism illustrated in the drawings comprises a support 10 including a base 11 and a pair of spaced vertical side walls 12. An upper plate 13 of the support 10 has an elongated recess comprising a film bed 14 formed therealong which is adapted to receive a microfilm strip such as the strip 15. The side walls 16 of the film bed act as guides to guide the film strip 15 through the film bed and are spaced apart a distance approximately equal to the width of the film strip 15.

The film strip 15 is wound on a spool **16*a* which, in turn, is rotatably mounted on a pin 17 extending outwardly from a rearwardly extending leg 18 which is connected to the support 10 by screws 19. The inner side wall 20 of the leg 18 is disposed in coplanar relation with the side wall 16 on that side of the film bed to serve as an additional guideway for guiding the film strip into and through the film bed 14. A guide block 21 is secured to the upper plate 13 by screws 22 and has its inner surface spaced from the inner surface 20 of the leg 18 a distance approximately equal to the width of the film strip 15 and in coplanar relation with the side wall 16 of the film bed at its respective side of the plate 13. A shaft 23 has one end journaled in the guide block 21 and its opposite end journaled in the leg 18 and has a roller 24 formed of rubber or a rubber-like material mounted thereon. The roller is maintained in a fixed position on the shaft 23 between the leg 18 and the block 21 by means of spacers 25**.

A shaft 26 is likewise journaled within the vertical side walls 12 at a point spaced directly below the shaft 23 and beneath the plate 13 and has a roller 27, similar to the roller 24, mounted thereon. The plate 13 is apertured as at 28 and the roller 27 is of sufficient diameter to extend up into this aperture. The roller 24 contacts the roller 27 at the aperture 28 and this point of contact is disposed in the same plane as the film bed 14.

It will be observed that the spool **16*a* is mounted on the spindle 17 so that the film strip 15 extends from the top of the spool to the point of contact of the rollers 24 and 27 and onto the film bed 14. A knob 29 is keyed to the shaft 26 so that clockwise rotation of that knob (as viewed in FIGURE 1) will act to pull the film strip 15 from the spool 16*a* and through the rollers and thence onto the film bed 14. The spool 16*a* will then rotate on the spindle 17** as the film strip is pulled through the rollers.

The opposite end of the plate 13 is recessed somewhat from the plane of the film bed 14 and has a transparent glass or plastic plate 31 mounted thereon, the upper surface of which defines the major portion of a generally horizontal card bed 32, which surface lies in a plane parallel to but spaced slightly below the plane of the film bed 14. In fact, the card bed 32 lies in a plane which is spaced below the plane of the film bed 14 a distance approximately equal to the thickness of a film record card 33.

The film record card 33 has a rectangular aperture 34 formed therein and transparent enveloping members or sheets 35, which are also rectangular in configuration, mounted on the top and bottom surfaces, respectively, of the card so that they overlie the aperture 34. The enveloping members 35 are mounted over the aperture 34 so that their edges overlie portions of the card defining the aperture but only three edges of each of the enveloping members are secured to the respective top and bottom surfaces of the card. In each case, an unsecured portion (**35*a***) of the enveloping member overlies the card along the edge of the aperture adjacent the nearest end of the card. A slight gap may be formed between the unsecured edges of the enveloping members and the record card although this gap will of course be very small and may not exist at all. In any event, it is at this point that a film strip is inserted between one of the enveloping members and an associated surface of the record card. The card pocket is that space formed intermediate the enveloping members which is defined by the four edges of the aperture. However, it will be understood as has already been pointed out that some cards are arranged with only a single enveloping member and the film strip is adapted to be mounted in a pocket formed between that enveloping member and the associated surface of the card.

In the illustrated embodiment of our invention, the enveloping members 35 are transparent so that light can be transmitted through those members as well as through the film strip contained within the film pocket if and when it is desired to project the film strip image on a screen so that removal of the film strip from the film pocket for this purpose is not necessitated.

It will be noted that the glass plate 31 forming part of the card bed 32 terminates at a shoulder 36 and that a depression 37 is formed transversely of the support 10 within the card bed 32 and lies intermediate the shoulder 36 and a shoulder 38 which is formed at the junction of the film and card beds.

A transparent cover plate 40 is secured to the upper plate 13 and overlies the film bed 14 and a portion of the card bed 32. The portion of the undersurface 41 of the cover plate 40 overlying the film bed is spaced from the film bed a distance approximately equal to the thickness of the film strip 15 for reasons which will hereinafter become apparent. The cover plate 40 extends completely over the depression 37 but only two side arms 41 and 42 extend any appreciable distance past the depression 37. This arrangement was devised so that no portion of the cover plate would overlie the film pocket within a record card when that record card is properly disposed on the card bed for reasons which will hereinafter be pointed out.

A guide block 43 is affixed to the support 10 and serves to guide a record card into its proper mounted position on the card bed 32 with the longitudinal center axis of the aperture within the card disposed coincident with a center line of the film bed 14.

A roller 44 is freely mounted within an elongated receiving groove 45 formed in the undersurface 41 of the cover plate 40 at a point substantially overlying the depression 37. This roller is of such diameter and is so mounted within the groove 45 that it tends to slightly depress the end of the record card mounted thereunder into the depression 37. The spacing between the major flat portion of the card bed 32 and the undersurface 41 of the cover plate 40 is approximately equal to the combined thicknesses of the record card and the film strip 15 (the edges of the enveloping members having negligible thickness) and the card bed 32 lies in a plane spaced from the plane of the film bed 14 a distance approximately equal to the thickness of the record card itself so that the upper surface of the record card lies substantially coplanar with the film bed 14.

Figure 4:
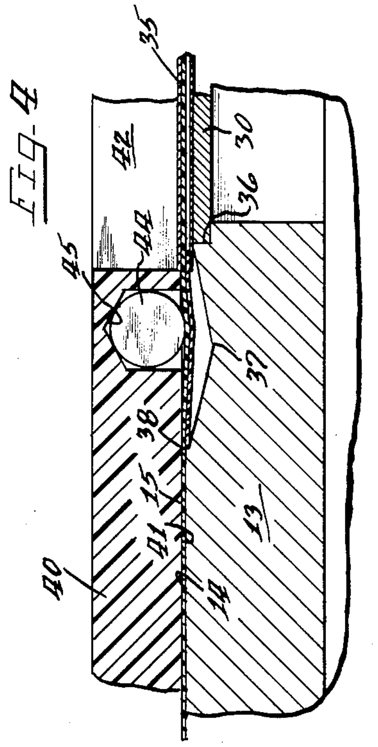
FIGURE 4 is a fragmental vertical sectional view through the mechanism illustrated in FIGURE 2 which shows the roller assembly that is effective to maintain the upper surface of the record coplanar with or below the plane of the film bed.
Figure 6:
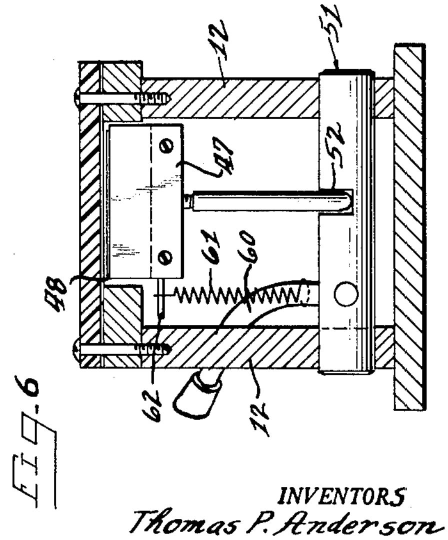
FIGURE 6 is a transverse vertical sectional view through the structure shown in FIGURE 2 which is taken along lines VI—VI of FIGURE 2.

From the foregoing it will be observed that a record card can be inserted into the space between the cover plate arms 42 and the card bed and will be guided into position by the guide block 43 and can be moved into engagement with the shoulder 38. Rotation of the knob 29 will move the film strip 15 through the film bed and thence past the shoulder 38 and onto the upper surface of the record card in the manner illustrated in FIGURE 4. Further rotation of the knob 29 will move the leading edge (or free edge) along the upper surface of the record card and thence between the upper enveloping member 35 and the card surface and into the film pocket.

Figure 3:
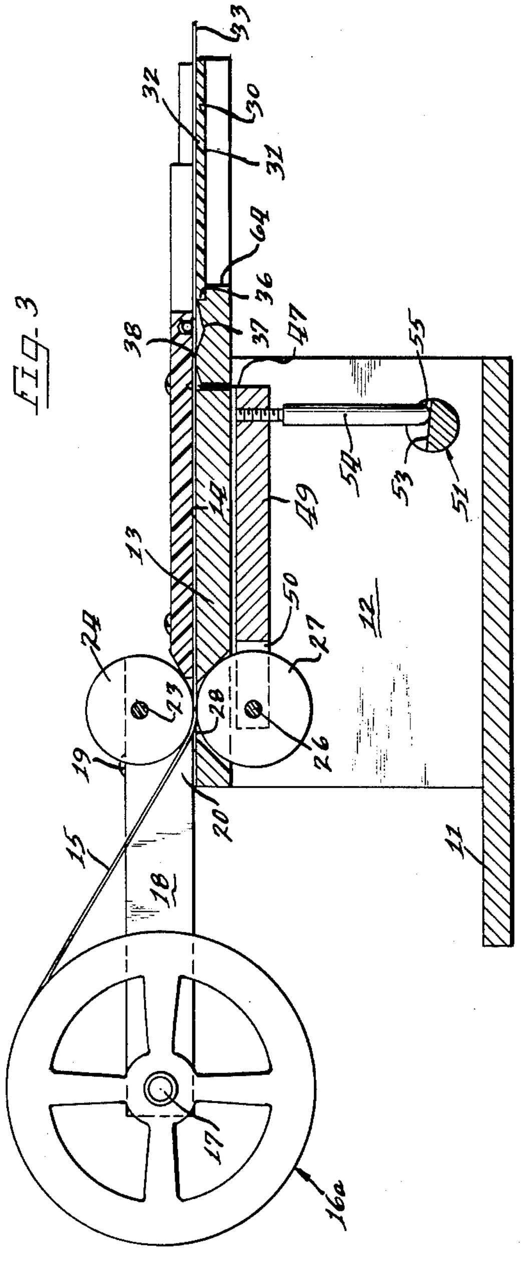
FIGURE 3 is a vertical sectional view of the structure illustrated in FIGURE 2 and taken along lines III—III of FIGURE 2.

Cutting of the film strip is effected by means of a slitter blade 47 which has an edge 48 and which is movable through an elongated aperture 49 formed within the upper plate 13 and extending transversely across the film bed 14. The slitter blade 47 is secured to and carried on a plate 49*a* which has a pair of spaced arms formed integrally therewith at the rear end thereof which, in turn, are pivotally mounted on the shaft 26. A cam shaft 51 is journaled for rotatable movement in the vertical side walls 12 and has a slotted portion 52 formed centrally thereof and providing a flat cam surface 53. A shaft 54 is adjustably screw threaded within the pivoted plate 49*a* and has a rounded end portion 55 positioned in engagement with the flat cam surface 53 at a point displaced from the center axis of the shaft 51. Consequently, rotation of the shaft 51 in a counterclockwise direction from the position shown in FIGURE 3 will act to move the shaft 54 upwardly and will thereby act to pivot the plate 49*a* and move the slitter blade 47 upwardly within the aperture 49.

The method and means whereby the film strip is cut and the cut film strip piece is inserted into the film pocket of a record card is one of the principal features of the invention herein disclosed. The operator can move the film strip 15 along the film bed until the point of the film strip which he wishes to cut is disposed precisely over the aperture 49. The operator can then cut the film strip by rotating the shaft 51 and thereby moving the blade 47 up through the aperture 49. To provide a means for effecting such rotation of the shaft 51 we have mounted a lever arm 60 on the shaft 51 and this lever arm protrudes from the rear end of the support so that depressional movement of the free end thereof will effect counterclockwise rotatable movement of the shaft 51 as viewed in FIGURE 3. A return spring 61 interconnects the lever arm 60 with a pin 62 protruding from on side of the pivoted plate 49 and thus serves to bias the plate 49 and blade 47 to the position shown in FIGURE 3.

An important aspect of the invention resides in the provision of a groove 57 within the undersurface 41 of the cover plate 40. This groove is formed within the plate so that it overlies the aperture 49 and serves as a seat for the slitter blade edge 48. The maximum cross-sectional dimension of the groove 57 is greater than the cross-sectional width of the slitter blade 47 so that a space 58 is provided even when the slitter blade 47 is in its upwardmost position as is illustrated in FIGURE 5. We have recognized the fact that continued movement of a blade edge into engagement with the cover plate 40 (which might for instance be formed of plastic) might cause some chafing of the undersurface of the plate at the point of contact of the blade and the plate and if no groove were provided the particles chafed from the undersurface of the cover plate might lie in the path of movement of the film strip along the film bed and such particles might be moved along by the film strip and scratch or othwise injure the strip as it passed through the feeder mechanism. With the arrangement we have provided, any particles chafed from the surface of the cover plate 40 by the blade edge 48 will remain within the space 58 and will not lie in the path of movement of the film strip as it passes along the film bed. In this connection it should also be observed that we have provided a chamfer on the forwardmost edge of the aperture 49 to prevent the leading edge of the film strip from catching on the aperture edge as the film strip passes over the aperture.

It will be observed that the aperture 49 is placed quite close to the shoulder 38 so that the leading or forward edge of the film piece (that portion of the film strip cut away from the remainder of the film strip mounted on the roll 16*a*) has its leading or outermost edge already positioned on the upper surface of the record card when the cutting operation takes place. Subsequent rotation of the knob 29 in a clockwise direction as viewed in FIGURE 1 will move the film strip along the film bed in the direction of the record card. The leading or outermost edge of the film strip will abut the trailing or innermost edge of the film strip piece and will move the film piece along the film bed ahead of the film strip. It will now be observed that movement of the film piece by the leading edge of the film strip can be effected due to the spacing between the cover plate 40 and the upper surfaces of the record card and the film bed. This spacing is not sufficient to permit the leading edge of the film strip to creep over or under the trailing edge of the film piece. The operator can continue to rotate the knob 29 until the film piece has been moved entirely within and dropped into the film pocket within the record card. Once this has been effected, the operator can then rotate the knob 29 in an opposite direction to withdraw the leading edge of the film strip rearwardly of the shoulder 38 and another record card can then be mounted on the card bed.

Lastly, it will be observed that we have provided an aperture 64 within the upper plate 13 which is of a size slightly larger than the apertures of the record cards and which lies beneath the transparent plate 31 in a manner such that it will underlie the aperture of a record card when a record card is properly positioned on the card bed. This will permit the passage of light through the card aperture from below the upper plate 13 so that the film piece can be viewed after it has been mounted in the card pocket while the record card is still mounted on the card bed. In addition, this arrangement permits the employment of a projector to project the image contained on the film piece onto a screen while the film piece is disposed in the film pocket of a record card mounted on the card bed. The projector could be mounted beneath the plate 13. Of course, a prism or mirror system could be employed above the film feed assembly to effect projection of the image on a wall or vertical screen at one side or the other of the film feed assembly. Such an arrangement however constitutes no part of this invention and will be understood by those skilled in the art.

It should be understood that the method and means for effecting the cutting of film strip and feeding film pieces into the film pockets formed within record cards has been used for illustrative purposes only and that various modifications and variations in the invention can be effected without departing from the spirit and scope of the novel concepts thereof.

We claim as our invention:

1. A film feed mechanism for feeding film into record card pockets formed by at least one enveloping member mounted on a card surface which comprises: a support having a film bed and having a card bed recessed slightly from said film bed; a shoulder leading from one to the other of said beds; whereby a record card can be placed upon said card bed with an edge which is parallel to an unsecured edge of its respective enveloping member disposed in engagement with said shoulder; means confining a film strip for travel along said film bed; means for slitting the film strip carried on said film bed to form a film piece suitably sized for placement within a record card pocket; and means for moving said film strip along said film bed to push the film piece into a record card pocket.

2. A film feed mechanism for feeding film into record card pockets formed by at least one enveloping member mounted on a card surface which comprises: a support having a film bed and having a card bed recessed slightly from said film bed; a shoulder leading from one to the other of said beds; means mounting a curled film strip on said support; guide means formed on said support for guiding the film strip along said film bed; a transparent cover plate connected to said support and overlying said film and card beds; whereby said cover plate is spaced from said film bed a distance approximately equal to the thickness of said film strip and from said card bed a distance approximately equal to the combined thicknesses of said card and said film strip; means for cutting said film strip while it is on said film bed to form a film piece suitably sized for placement within a record card pocket; and means feeding said film strip along said film bed and beneath said cover plate so that the strip is curled toward said film bed to push the film piece into a record card pocket.

3. A film feed mechanism for feeding film into record card pockets formed by at least one enveloping member mounted on a card surface which comprises: a support having a film bed and having a card bed recessed slightly from said film bed; a shoulder leading from one to the other of said beds; means mounting a film strip on said support; guide means formed on said support for guiding the film strip along said film bed; a cover plate connected to said support and overlying said film and card beds; whereby said cover plate is spaced from said film bed a distance approximately equal to the thickness of said film strip and from said card bed a distance approximately equal to the combined thicknesses of said card and said film strip; said film bed having an elongated aperture formed therein; a slitter knife having an edge positionable beneath the plane of said film bed; means for moving the edge of said knife toward and into engagement with said cover plate to cut through a film strip overlying said aperture; means biasing said blade to position said blade edge beneath the plane of said film bed; and means for moving said film strip longitudinally along said film bed to push the film piece into a record card pocket.

4. The film feed mechanism recited in claim 3 wherein said cover plate is transparent.

5. The film feed mechanism recited in claim 3 wherein a groove is formed along the lower surface of said cover plate to receive said blade edge which has a cross-sectional dimension greater than the cross-sectional dimension of said slitter blade.

6. The film feed mechanism recited in claim 3 wherein said cover plate is transparent and wherein a groove is formed along the lower surface of said cover plate to receive said blade edge which has a cross-sectional dimension greater than the cross-sectional dimension of said slitter blade.

7. A film feed mechanism for feeding film into record card pockets formed by at least one enveloping member mounted on a card surface which comprises: a support having a film bed and having a card bed recessed slightly from said film bed; a shoulder leading from one to the other of said beds; means mounting a curled film strip on said support; guide means formed on said support for guiding the film strip along said film bed; a transparent cover plate connected to said support and overlying said film and card beds; whereby said cover plate is spaced from said film bed a distance approximately equal to the thickness of said film strip and from said card bed a distance approximately equal to the combined thicknesses of said card and said film strip; said film bed having an elongated aperture formed therein; a slitter knife having an edge positionable beneath the plane of said film bed; a groove formed along the undersurface of said cover plate having a cross-sectional dimension greater than the cross-sectional dimension of said slitter knife; means for moving the edge of said slitter knife toward and into engagement with said cover plate within said groove to cut through a film strip overlying said aperture; means biasing said blade to position said blade edge beneath the plane of said film bed; and means feeding said film strip along said film bed and beneath said cover plate so that the strip is curled toward said film bed to push the film piece into a record card pocket.

8. A film feed mechanism for feeding film into record card pockets formed by at least one enveloping member mounted on a card surface which comprises: a support having a flat film bed and having a flat card bed disposed in a plane recessed slightly from the plane of said film bed but parallel therewith; a shoulder leading from one to the other of said beds; said card bed having a depression formed therein adjacent to said shoulder; means mounting a film strip on said support; a cover plate connected to said support and overlying said film and card beds; whereby said cover plate is spaced from said film bed a distance approximately equal to the thickness of said film strip and from said card bed, except for the portion thereof overlying said depression, a distance approximately equal to the combined thicknesses of said card and said film strip; means contained within a portion of said cover plate overlying said depression effective to hold a portion of the card lying thereunder in spaced relation from said cover plate; means for cutting said film strip while it is on said film bed to form a film piece suitably sized for placement within a record card pocket; and means for moving said film strip longitudinally along said film bed to push the film piece into a record card pocket.

9. A film feed mechanism for feeding film into record card pockets formed by at least one enveloping member mounted on a card surface which comprises: a support having a film bed, a card bed mounted on said support and having an end recessed slightly from said film bed; a shoulder formed at the said end of said card bed; means carrying a film strip on said support; guide means formed on said support for guiding the film strip along said film bed; a cover plate connected to said support and overlying said film bed; whereby said cover plate is spaced from said film bed a distance approximately equal to the thickness of said film strip; cutting means mounted on said support for cutting said film strip while it is on said film bed to form a film piece suitably sized for placement within a record card pocket; and film strip moving means for moving said film strip longitudinally along said film bed to push the said cut film piece into the pocket of a record card mounted on said card bed.

References Cited in the file of this patent

UNITED STATES PATENTS

| | | |
|---|---|---|
| 1,686,132 | Heeter | Oct. 2, 1928 |
| 2,384,494 | Schutter | Sept. 11, 1945 |
| 2,892,295 | McArthur | June 30, 1959 |
| 2,937,483 | Engelstein | May 24, 1960 |
| 3,019,579 | Heckman | Feb. 6, 1962 |